Oct. 16, 1962   C. D. WILLSON   3,058,769
STOCK-CAR DOMESTIC ENSEMBLES
Original Filed Sept. 27, 1956
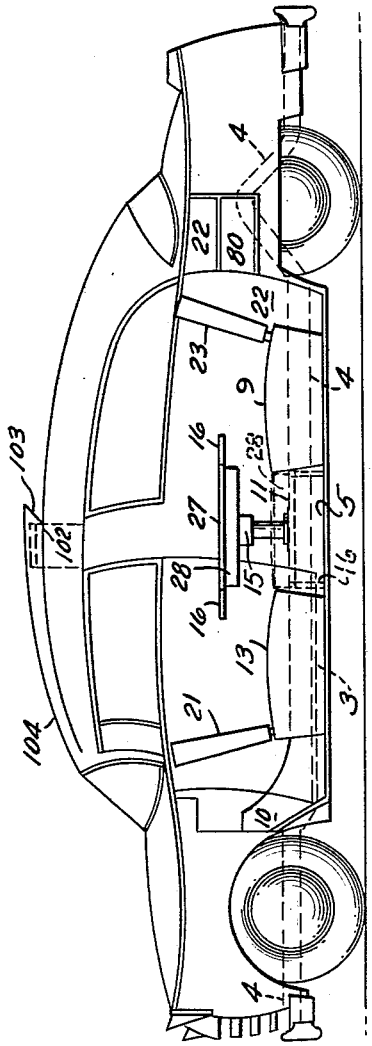
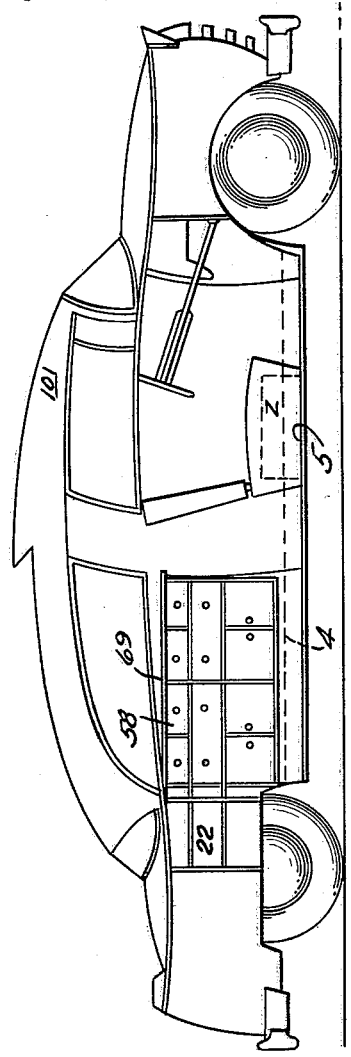
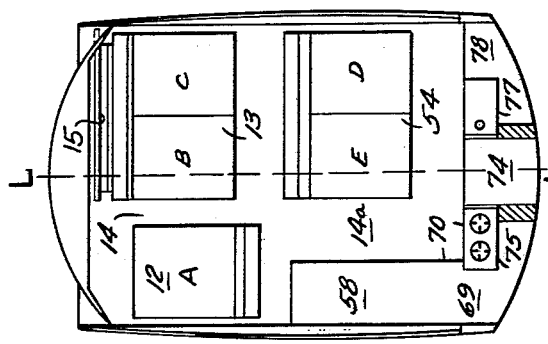
INVENTOR
Conom D Willson United States Patent Office 3,058,769
Patented Oct. 16, 1962

3,058,769
STOCK-CAR DOMESTIC ENSEMBLES
Corwin D. Willson, 525 Goldengate St.,
Lake Orion, Mich.
Continuation of application Ser. No. 612,553, Sept. 27, 1956. This application June 25, 1958, Ser. No. 744,419
5 Claims. (Cl. 296—23)

This invention relates to domestic ensembles making the stock family car convertibly safer, more homelike and far more useful both on and off the highway. By "stock family car" is meant a motorcar of a type that attains mass production, such as what, in the language of the automotive industry, are known by the terms sedan, coach, convertible, hardtop, station wagon and road cruiser models. This application is a continuation of my copending and now abandoned application Ser. No. 612,553, filed September 27, 1956 which was a continuation-in-part of my subsequently abandoned application Ser. No. 296,-800, filed July 2, 1952 which was a continuation-in-part of my application Ser. No. 774,763, filed September 18, 1947 and issuing as Pat. No. 2,638,374 and which was a continuation-in-part of my subsequently abandoned application Ser. No. 437,708, filed April 4, 1942.

Since there has been a minimum adaptation of car design to the changing in-transit domestic needs of the average motoring family, the primary object of this invention is a stock car domestic ensemble that can make the family car quickly convertible from use only in transport to greater domestic use both when parked and in transit: the domestic ensemble including a variety of means combinable to make the car body more homelike even to the point of use on occasion as a minimal automotive dwelling, means that, at the same time, automatically decrease the hazards of injury and death from highway accident.

Another object of the invention is a stock car domestic ensemble that includes means of storage for bedding, cooking and eating utensils, food, clothing and other impedimenta of travel out of sight of passengers but directly accessible to passengers seated in the passenger compartment.

Another object of the invention is a stock car domestic ensemble that includes a demountable dinette table having a horizontal component entering into the makeup of a berth formed between the bottoms of a pair of upwardly diverging seatbacks in said ensemble.

Another object of the invention is a stock car domestic ensemble that includes means of horizontal repose for a number of passengers in transit, the means extending in and athwart the longitudinal center axis of the car body and a longside a passage of access to said means.

Another object of the invention is a stock car domestic ensemble that includes means of seating two abreast groups of passengers face-to-face.

Another object of the invention is an automotive domestic ensemble that enables all passengers except the driver to ride from choice rearward-facing in times of dangerous traffic.

These and other novel features and objects of the invention are hereinafter more fully described and claimed and the preferred form of my stock car domestic ensemble is shown in the accompanying drawings in which:

FIG. 1 is a floor plan of the sole passenger compartment of a family car and showing the seats for all passengers except the driver made temporarily rearward-facing.

FIG. 2 is a view of the righthand side of the passenger compartment showing the seatback of the aftseat of FIG. 1 reversed so that all passengers other than the driver face opposite sides of a demountable table as in a dinette.

FIG. 3 is a view of the lefthand side of the passenger compartment showing, behind the seat for the driver, housekeeping components of the ensemble including a dresser and housekeeping facilities beneath a worktop that extends around one corner of the compartment.

As indicated in the drawings, the stock car body is a two-door coach, although a third door on the righthand side of the body may be added if desired. Door bottom 3 extends slightly below the topside level of the contiguous bottom frame member 4 which may be part of a unit framed body. Floor 5 for foot space and legroom of seated occupants of the passenger compartment supports transverse forwardly-facing aftseat 9 at a level below the top side of frame member 4. Rearwardly from transmission housing 10 extends driveshaft tunnel 11 between and above opposite side areas of floor 5. A single forward-facing seat 12 for driver extends next to the front lefthand side of the passenger compartment and is laterally in general alignment with temporarily rearward-facing transverse double seat 13 for passengers B and C and extending next to the front righthand side of the passenger compartment. Seat 12 is separated from wider seat 13 by narrow gap 14 which, rearwardly of seats 12 and 13 becomes the wider passage 14a.

While riding rearward-facing in dangerous traffic, the safety of passengers B and C is greatly enhanced. Seat belts and padded instrument panels are not required to prevent rearward-facing passengers B and C from pitching violently forward and through the windshield. In FIG. 1, the structure ensures that the spines of passengers B and C are resiliently protected from collision impact by reversible front seatback 21 which serves also as a closure for the storage of demounted table 15. When forwardly-facing seat 9 for passengers D and E has its seatback 23 reversed as in FIG. 1 to make up rearward-facing seat 54, the same safety protection as for rearwardly-facing occupants of front seat 13 is afforded the rearward-facing occupants of seat 54, and floor 5 back of seat 54 provides adequate foot and leg room for said rearwardly facing occupants. A slight fore and aft movement of seat 9 permits the space between seats 13 and 9 to be increased when occupants of the two seats face opposite sides of table 15 next to drop-leafs 16 of hard-topped tabletop 27 having soft underside 28. Demounting tabletop 27 and turning it over to extend softside up in the space between and level with seats 9 and 13 converts the two seats into a double berth extending between the lower ends of seatbacks 21 and 23. Seatback 23 of forward-facing seat 9 serves as a closure for storage space 22 and under these conditions, where front seatback 21 has its bottom edge slid aft across the top surface of seat 13 to be forward-facing, then demounted table 15 may be transferred from storage ahead of rearward-facing seatback 21 to aft storage space 22 behind forward-facing seatback 23. Taken together, face-to-face seats 13 and 9 and table 15 as shown in FIG. 2 secured to one side of the body, make up a dinette seating four passengers independent of driver A.

Right across passage 14a from forward-facing back seat 9 is dresser 58 abutting the lefthand wall of the body.

Dresser 58 constitutes a forward extension of transverse enclosure 22 which extends from one side to the opposite side of the body between and above the aftwheels supporting the body. Enclosure 22 is made up of subdivisions specialized for particular uses. Enclosure 22 and dresser 58 are under L-shaped worktop 69 extending around one back corner of the passenger compartment. Together these components of the domestic ensemble make up unit 70 which is directly accessible to the rearward-facing occupants of seat 54. Since the total length of unit 70 may be more than seven feet, it is apparent what a substantial amount of enclosed space unit 70 makes directly manually accessible in transit to the safely seated backseat occupants. This enclosed space may include cold-food storage cabinet 74 which may be part of a cold air-conditioning unit, and cookstove 75 which may be hidden when not in use under a removable part of worktop 69, and lavatory or sink 77 which may be hidden when not in use under another removable part of worktop 69. Worktop 69 extends above drawer 78 and division 80 for storing cooking and other utensils. Bases of seats 9, 12 and 13 enclose hollow interiors Z for the storage of bedding and the like.

The forehalf of roof 101 is of multi-wall construction and houses between inner and outer coverings a system of air-conditioning ducts including inverted U-shaped duct 102 upwardly bowed between opposite sides of said forehalf which has a gradual upward and backward slant terminating in an abrupt downward step at the end of duct 104 which extends lengthwise in the top of the body. While this downward step makes a "comb" extending right across the body top, it will be understood that the exact fore and aft position of this downward step may be varied within wide limits so long as it constitutes an abrupt downward step from the rooftop and body ventilating openings are backwardly exposed in this step.

In view of the upward protrusion of transmission housing 10 restricting passenger B's leg and foot room, the invention provides adequate foot and legroom for passenger B in rearward-facing posture behind transmission housing 10 and seat 13. Provision of gap 14 permits interchange of passengers between fore and aft seats in transit without any necessity of pulling off the highway and parking while the passengers pile out to effect the interchange. Gap 14 and passage 14a together make up a fore and aft passage lying wholly outside the lengthwise center axis of the body L—L and seats 9 and 13 extend in and athwart this axis. While the drawings relate particularly to a low-slung car body powered by an engine at the front end of the body, it is intended that the structure as described, except for transmission housing 10 and driveshaft tunnel 11, be equally applicable to cars powered by prime movers at the rear end of the body.

The domestic ensemble now described lessens the touring family's dependence on food and shelter of costly, unknown and dubious character and renders family cars of long accepted types safer and more homelike. The components of the domestic ensembles may be converted to the various uses described and utilized both in transit and when parked. In spite of the tremendous increase in family mobility, the proper shelter for this mobility of nearly seventy million car families in this country alone has been allowed to lag. Without lessening the family car's utility as transport and with little change in the outside appearance of the car housing the domestic ensembles herein described, the invention meets the basic and growing need of better sheltering our mobility. Growth is a consequence of sensible and inventive adaptations to changing needs.

The drawings, being illustrative only, are more or less diagrammatic in character to show the preferred relation of the parts and it will be understood that changes may be made in various parts without vitally altering the character of the whole or departing from the spirit and scope of the invention as set forth in the appended claims; and all changes which come within the meaning and range of equivalency of the claims are therefore intended to be embraced therein.

Having thus broadly defined and fully described my invention, its utility in motion and at rest, its domestic character, versatile structure, mode of conversion and use, what I claim and desire to secure by Letters Patent of the United States is:

1. A domestic ensemble in a motorcar having a body on fore and aft roadwheels and a passenger compartment housing driving controls below a transparent windshield, said compartment seating not less than five passengers not more than three in the same transverse vertical plane: components of said ensemble in said compartment and ahead of the axes of the aftwheels comprising a driving seat facing said controls, and a family dinette spaced from one side of the body and extending in the lengthwise center axis of the body alongside a transversely off-center fore and aft passage, and a storage and work cabinet next to the same side of the body as said driving seat and extending right across said passage from one seat of said dinette.

2. A domestic ensemble in an automotive body supported on fore and aft roadwheels and enclosing a compartment housing driving controls below a transparent windshield, the compartment seating not fewer than five passengers not more than three in the same transverse vertical plane: components of said ensemble comprising a driving seat next to the lefthand side of the body and facing said controls and a dinette separate from said driving seat and having a tabletop contiguous to a transversely off-center fore and aft passage, and a dresser next to the lefthand side of the body back of said driving seat and extending right across said passage from said dinette and said dinette including drawers and a worktop.

3. A domestic ensemble in an automotive body supported on forewheels and aftwheels and enclosing a compartment housing driving controls below a transparent windshield, the compartment seating a driver and not fewer than four other passengers not more than three thereof in the same transverse vertical plane: components of said ensemble in said compartment comprising a driving seat facing said controls and a dinette including seats for four passengers and lying in the lengthwise center axis of the body in spaced relation to one side of the body and contiguous to a transversely off-center fore and aft passage that extends around one corner of the dinette to a worktop and sanitary receptacle behind said dinette.

4. A domestic ensemble in an automotive body supported on forewheels and aftwheels and having a compartment housing said ensemble and driving controls and seating not fewer than five passengers of whom one is a driver facing said controls and said compartment seating not more than three of said passengers in the same transverse vertical plane: components of said ensemble comprising a pair of double seats next to one side of the body and a domestic group of facilities including a worktop extending around one back corner of the compartment; a passage accessible from an entrance door into said compartment and extending alongside said pair of seats and said corner group of domestic facilities.

5. A domestic ensemble within the passenger compartment of a family car body on fore and aft roadwheels, the compartment housing driving controls below a transparent windshield and components of said ensemble comprising a driving seat at said controls and a dinette made up of seats for not fewer than four passengers not more than three thereof in the same transverse vertical plane and facing a tabletop having means of being demountably secured to the body, said dinete seats being face to face and having spaced bottom cushions and said tabletop having a soft underside that, when the tabletop is supported soft-side-up between the spaced bottom cushions, converts said dinette into a berth.

(References on following page)

References Cited in the file of this patent

UNITED STATES PATENTS

| | | |
|---|---|---|
| 1,163,056 | Zimmerman | Dec. 7, 1915 |
| 1,387,911 | Shefts | Aug. 16, 1921 |
| 1,457,984 | Mandel | June 5, 1923 |
| 1,498,874 | Hopkins | June 24, 1924 |
| 1,658,110 | Warren | Feb. 7, 1928 |
| 1,716,316 | Lanning | June 4, 1929 |
| 1,734,213 | Jones | Nov. 5, 1929 |
| 2,128,930 | Fageol et al. | Sept. 6, 1938 |
| 2,638,374 | Willson | May 12, 1953 |

OTHER REFERENCES

A "Motorlounge," article in "The Autocar" of Dec. 18, 1936, page 1212.

UNITED STATES PATENT OFFICE
CERTIFICATE OF CORRECTION

Patent No. 3,058,769            October 16, 1962

Corwin D. Willson

It is hereby certified that error appears in the above numbered patent requiring correction and that the said Letters Patent should read as corrected below.

Column 4, line 34, for "dinette" read -- dresser --.

Signed and sealed this 19th day of January 1965.

(SEAL)
Attest:

ERNEST W. SWIDER            EDWARD J. BRENNER
Attesting Officer            Commissioner of Patents